United States Patent [19]

Berger et al.

[11] 4,280,042
[45] Jul. 21, 1981

[54] PROCESS AND INSTALLATION FOR AUTOMATIC IGNITION OF A PLASMA CUTTING TORCH

[75] Inventors: Jean-Yves Berger, Bessancourt; Michel Kostelitz, Versailles; Bernard Reynaud, L'Isle Adam; Raymond Egee, Champagne-sur-Oise, all of France

[73] Assignees: L'Air Liquide, Societe Anonyme pour l'Etude et l'Exploitation des Procedes Georges Claude; La Soudure Autogene Francaise, both of Paris, France

[21] Appl. No.: 114,200

[22] Filed: Jan. 22, 1980

[30] Foreign Application Priority Data

Feb. 1, 1979 [FR] France .................................. 79 02610

[51] Int. Cl.³ ................................................ B23K 9/10
[52] U.S. Cl. ........................ 219/121 PT; 219/121 PV; 219/121 PW; 219/124.02; 219/137 R; 266/76
[58] Field of Search ........... 219/137 R, 130.4, 124.02, 219/124.03, 121 P, 130.1; 228/102, 8, 9; 266/76

[56] References Cited

U.S. PATENT DOCUMENTS

| 3,513,281 | 5/1970 | Haase et al. ...................... 219/124.02 |
| 3,774,007 | 11/1973 | Chiasson et al. .................. 219/130.4 |
| 4,017,707 | 4/1977 | Brown et al. ..................... 219/124.02 |
| 4,156,125 | 5/1979 | Brown ............................. 219/124.02 |
| 4,170,727 | 10/1979 | Wilkins ........................... 219/124.03 |
| 4,203,022 | 5/1980 | Couch, Jr. et al. ............. 219/124.02 |

FOREIGN PATENT DOCUMENTS 727311  3/1955  United Kingdom .................. 219/130.4

*Primary Examiner*—Gene Z. Rubinson
*Assistant Examiner*—Mark H. Paschall
*Attorney, Agent, or Firm*—Lee C. Robinson, Jr.

[57] ABSTRACT

The invention relates to a plasma cutting plant comprising a principal generator feeding a plasma arc between a workpiece and an electrode of a torch comprising a tube, with initial ignition by means of an ignition or striking arc between the electrode and the tube, via the resistor and the contactor. A circuit comprising a resistor and an excitation coil of a relay is installed across the terminals of the contactor. When the torch has been brought to the correct distance from the workpiece, the circuit detects this correct spacing and acts on the feed motor to stop the latter immediately.

10 Claims, 4 Drawing Figures

PROCESS AND INSTALLATION FOR AUTOMATIC IGNITION OF A PLASMA CUTTING TORCH

BACKGROUND OF THE INVENTION

In plasma cutting technology, making use of a torch comprising a refractory electrode and a tube for producing of a plasma, an electric arc is struck between the electrode and the workpiece which is to be cut. An ionised gas flowing within the interstitial space between the electrode and tube and finally through a tube constriction establishes the conditions for producing a plasma arc of appropriate characteristics.

The electrical power is then supplied by an electric d.c. generator the negative terminal of which is connected to the torch electrode and the positive terminal is connected to the workpiece.

In the application of this plasma cutting technique, it is appropriate to make provision for feeding the torch towards the workpiece which is to be cut up. The torch is fed to a correct working distance, and the cutting arc is established by closing the power supply circuit of the electric generator, commonly however after striking an auxiliary arc of low power between the torch electrode and tube, in such manner as to ionize the plasmagenic gas. In one form of application intended more particularly for automatisation, the plant comprises a mechanism for transferring the torch into position, for example a toothed rack and a forward and reverse motor, the whole being installed on a carriage for transverse displacement of the torch depending on the joint which is to be cut; means are incorporated for detecting the correct working position, which are of the capacitive probe type operating with a fixed frequency oscillator (for example 20 kHz) having voltage as a direct function of the gap between the workpiece and the probe which is, itself, integral with the torch. By means of an electronic circuit, this voltage is compared to a datum value which is picked by the operator of the torch to provide the correct spacing for the cutting operation.

This solution implies the presence of a detection device on the torch, and of an electronic processing circuit completing the control circuits of the torch-workpiece displacement mechanism, which represents a complex plant. In addition, the selection of the torch-workpiece spacing depends on the individual judgement of the operator. The choice of this spacing between the torch and the workpiece is of great importance since a slightly excessive gap does not allow the arc to be established and a slightly inadequate gap may cause damage to the torch tube by molten metals spattering, caused by violent striking of the arc.

It is an object of the invention to provide a process and a plant for automatic ignition of a plasma cutting torch which are uncomplicated in application and are particularly convenient in construction.

SUMMARY OF THE INVENTION

Accordingly, the invention in certain embodiments comprises in a method for the automatic ignition of a plasma cutting torch having an electrode and a tube for producing a plasma, of the kind in which the torch is arranged for forward and reverse feed with respect to a workpiece which is to be cut, by means of a motor, and the approach of the torch towards the workpiece which is to be cut is carried out until the appearance of an electric signal for measurement of the correct cutting gap between the torch and the workpiece. The signal stops the motor, so that, after an auxiliary arc for ignition is struck between the electrode and the tube, a plasma power cutting arc is formed between the electrode and the workpiece. The electric signal for stopping the motor is supplied in response to the intensity of the current of a low-power electric circuit between the electrode and the workpiece.

In other embodiments the invention comprises an installation for the automatic ignition of a plasma cutting torch having an electrode and a tube. A welding current generator is connected between the electrode and the workpiece, a circuit is provided for striking an auxiliary arc between the electrode and the tube, and a low-power arc circuit is connected between the electrode and the workpiece. Means are provided for displacing the torch towards the workpiece which means comprise an electric motor, and the stopping of the motor is implemented by a circuit arrangement which is responsive to the current of the low-power circuit.

BRIEF DESCRIPTION OF THE DRAWINGS

In order that the invention may be more clearly understood, reference will now be made to the accompanying drawings which show certain embodiments of installation by way of example and in which.

DETAILED DESCRIPTION OF PREFERRED EMBODIMENTS

Figure 1:
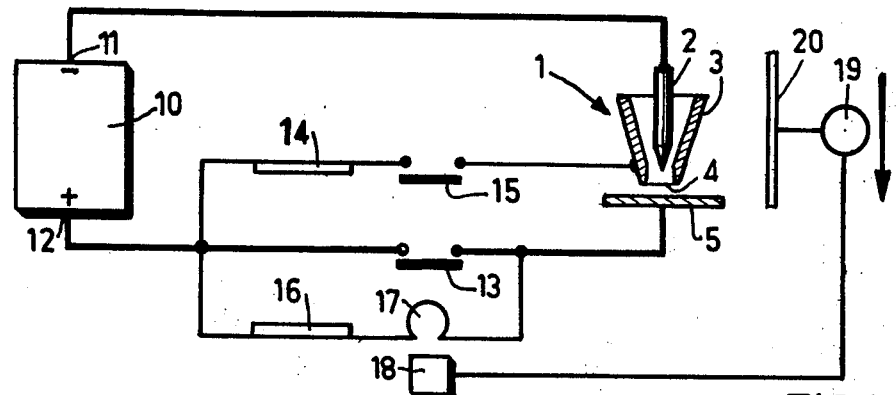
FIG. 1 is a block diagram of a first embodiment.

Referring now to the drawings, and firstly to FIG. 1, a welding torch 1 comprises a refractory electrode 2 which is arranged axially within a tube 3 having a constricted outlet 4 facing towards a workpiece 5 which is to be cut. A plasmagenic gas flows by virtue of means which are not illustrated, in the interstitial space between the electrode 2 and the tube 3. An electric d.c. generator 10 has its negative terminal 11 connected to the electrode 2 and its positive terminal 12 connected via a contactor 13 to the workpiece 5 which is to be welded, thus establishing the power cutting circuit. A first derivation incorporating a resistor 14 and a contactor 15 is set up between the positive terminal 12 of the generator 10 and the tube 3, in such manner that a low-power striking arc may be established between the electrode 2 and the tube 3.

A second derivation is set up between this same positive terminal 12 of the generator 10 and the workpiece 5, and it incorporates a resistor 16 and an excitation winding 17 of a relay 18 acting on a motor 19. The motor 19 controls the displacement of a torch carrier 20 along a direction at right angles to the plane of the workpiece 5 which is a metal plate in this case, for example.

The operation of the installation is the following: the torch carrier 20 is first positioned at a distance from the workpiece 5. The striking arc is set up between the electrode 2 and the tube 3 by closing the contactor 15, and provision is made to start the feed motor 19 for feeding the torch 1 towards the workpiece 5. Once the correct cutting distance has been reached, a low-power arc is struck between the electrode 2 and the workpiece 5, the intensity of which will for example be limited to a few amperes by virtue of the presence of the resistor 16.

This current is sufficient however to cause operation of the relay 18 via the excitation winding 17 and the immediate stopping of the motor 19. The torch 1 is then in the correct cutting position and the principal cutting arc is struck simply by closing the contactor 13.

Figure 2:
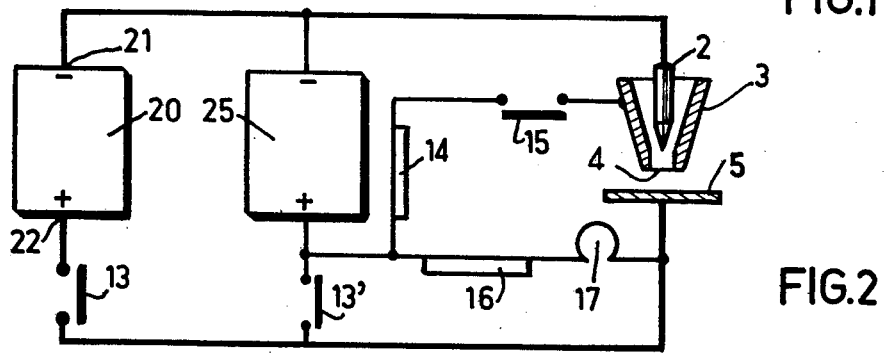
FIG. 2 is a block diagram of a second embodiment.

In the embodiment according to FIG. 2, a generator 20 is provided having a negative terminal 21 which is always connected to the electrode 2 and a positive electrode 22 which is connected to the workpiece 5 which is to be cut.

In this case, a second low-power generator 25 on the one hand serves the purpose of feeding the auxiliary arc via the circuit comprising the ignition resistor 14 and the contactor 15, and on the other hand feeds the positional detection circuit comprising the resistor 16 and the excitation coil 17.

At the instant in which the principal arc is struck, the contactor 13' is closed, which connects the two generators 20 and 25 in parallel across the load formed by the cutting arc.

Figure 3:
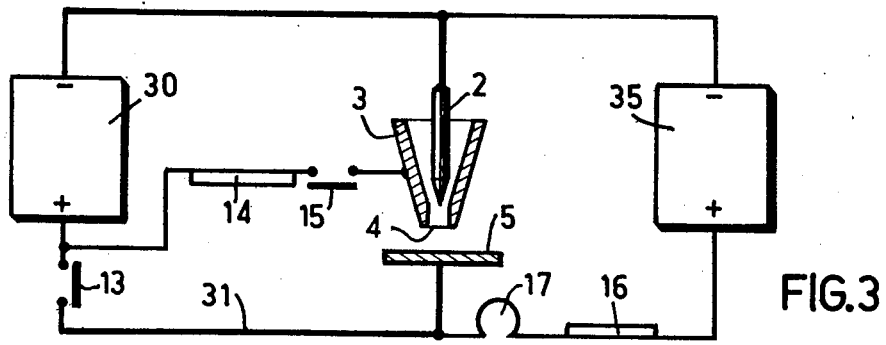
FIG. 3 is a block diagram of a third embodiment.

Referring to FIG. 3, a generator 30 is provided which acts as a power generator via a circuit 31 incorporating the contactor 13 on the one hand, and as a circuit for striking an auxiliary arc between the electrode 2 and the tube 3 and incorporating the resistor 14 and the contactor 15. The feed to the detection arc between the electrode 2 and the workpiece 5 is provided by a second generator 35 via the resistor 16 and the excitation winding 17.

Figure 4:
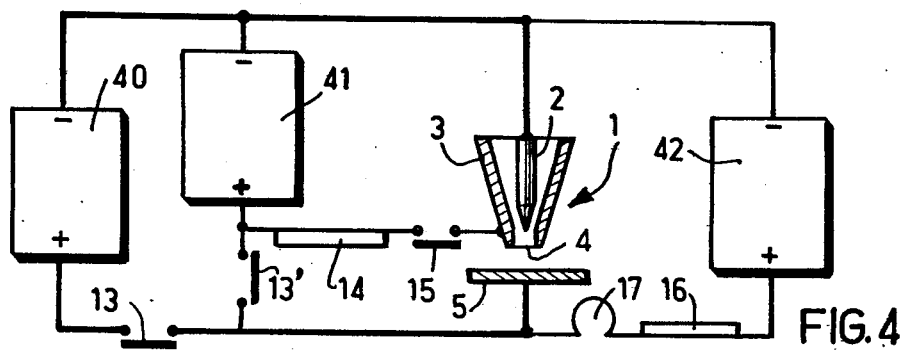
FIG. 4 is a block diagram of a fourth embodiment.

In accordance with the embodiment according to FIG. 4, three generators 40, 41 and 42 are provided. The generator 40 acts as a power generator via the contactor 13 to establish the cutting arc between the electrode 2 and the workpiece 5. The generator 41 acts as a generator for striking an auxiliary arc between the electrode 2 and the tube 3 via the circuit incorporating the resistor 14 and the contactor 15 with a take-off via the contactor 13' towards the workpiece 5, in such manner that during the cutting action it adds its power to that of the generator 40. The generator 42 by means of its resistor 16 and of its excitation coil 17 serves the purpose of establishing an arc for detection of the correct position of the torch 1 with respect to the workpiece 5.

The invention is applicable to the plasma cutting of metal workpieces and more particularly to automatic cutting.

We claim:

1. In a method for the automatic ignition of a plasma cutting torch having an electrode and a tube for producing a plasma, of the kind in which said torch is arranged for forward and reverse feed with respect to a workpiece and the approach of said torch towards the workpiece is carried out until the appearance of an electric signal for measurement of the correct cutting gap between said torch and the workpiece which causes the stopping of the torch, the invention which comprises supplying said electric signal in response to the sensed current intensity of a low-power electric circuit between said electrode and the workpiece.

2. In an installation for the automatic ignition of a plasma cutting torch of the type comprising an electrode and a tube with a welding current generator connected between said electrode and the workpiece, a circuit for striking an auxiliary arc between said electrode and said tube, and a low-power arc circuit between said electrode and the workpiece, the invention which comprises means for displacing said torch towards the workpiece, said means comprising an electric motor and means positively coupled with the current of said low-power circuit for stopping said motor.

3. An installation according to claim 2, wherein the welding current generator is connected to the workpiece by a high-power arc supply circuit having an opening switch, said low-power arc circuit including a circuit section connected across the terminals of the opening switch of said high-power arc supply circuit.

4. An installation according to claim 2, wherein said low-power arc supply circuit is fed by an individual d.c. generator separate from said welding generator.

5. In an installation for automatically positioning a plasma torch having primary and auxiliary electrodes in juxtaposition with a workpiece, in combination:
a high-power welding current generator;
first circuit means for connecting the welding current generator between the primary electrode and the workpiece;
second circuit means connected to the auxiliary electrode for striking an auxiliary low-power arc between said auxiliary electrode and said primary electrode;
means for displacing the plasma torch toward the workpiece, the low-power arc transferring from the auxiliary electrode to the workpiece as the torch approaches said workpiece to produce a low current passing through said workpiece; and
control means connected to the torch displacing means and automatically responsive to the appearance of said low current for arresting the displacement of the plasma torch toward the workpiece.

6. In an installation for automatically positioning a plasma torch having primary and auxiliary electrodes in juxtaposition with a workpiece, in combination:
a high-power welding current generator;
first circuit means including a normally open switch for connecting the welding current generator between the primary electrode and the workpiece;
second circuit means connected to the auxiliary electrode for striking an auxiliary low-power arc between said auxiliary electrode and said primary electrode;
means for displacing the plasma torch toward the workpiece, the low-power arc transferring from the auxiliary electrode to the workpiece as the torch approaches said workpiece to produce a low current between the primary electrode and said workpiece; and
control means connected to said first circuit means and automatically responsive to the appearance of said low current for arresting the displacement of the plasma torch toward the workpiece.

7. In an installation for automatically positioning a plasma torch having primary and auxiliary electrodes in juxtaposition with a workpiece, in combination:
a high-power welding current generator;
first circuit means including a normally open switch for connecting the welding current generator between the primary electrode and the workpiece;
second circuit means connected to the auxiliary electrode for striking an auxiliary low-power arc between said auxiliary electrode and said primary electrode;
means including an electric motor for displacing the plasma torch toward the workpiece, the low-power arc transferring from the auxiliary electrode to the workpiece as the torch approaches said workpiece to produce a low current between the primary electrode and said workpiece; and control means connected to said first circuit means and automatically responsive to the appearance of said low current for stopping said motor to thereby arrest the displacement of the plasma torch toward the workpiece, said control means including a relay connected across said normally open switch.

8. In an installation for automatically positioning a plasma torch having primary and auxiliary electrodes in juxtaposition with a workpiece, in combination:

a high-power welding current generator;

first circuit means including a normally open switch for connecting the welding current generator between the primary electrode and the workpiece;

a low-power auxiliary current generator;

second circuit means for connecting the auxiliary current generator to the auxiliary electrode to strike a low-power arc between said auxiliary electrode and said primary electrode;

means for displacing the plasma torch toward the workpiece, the low-power arc transferring from the auxiliary electrode to the workpiece as the torch approaches said workpiece to produce a low current between the primary electrode and said workpiece; and control means connected to said first circuit means and automatically responsive to the appearance of said low current for arresting the displacement of the plasma torch toward the workpiece, said control means comprising a high impedance and a normally closed relay connected in series with each other across said normally open switch.

9. In a method for automatically positioning a plasma torch having primary and auxiliary electrodes in juxtaposition with a workpiece, the steps of:

generating a high-power welding current for the formation of a welding arc between the primary electrode and the workpiece;

striking an auxiliary low-power arc between the primary electrode and the auxiliary electrode;

displacing the plasma torch toward the workpiece, the low-power arc transferring from the auxiliary electrode to the workpiece to produce a low current between the primary electrode and said workpiece; and automatically arresting the displacement of the plasma torch toward the workpiece in response to the appearance of said low current.

10. In a method for automatically positioning a plasma torch having primary and auxiliary electrodes in juxtaposition with a workpiece, the steps of:

generating a high-power welding current for the formation of a welding arc between the primary electrode and the workpiece;

striking an auxiliary low-power arc between the primary electrode and the auxiliary electrode;

displacing the plasma torch toward the workpiece, the low-power arc transferring from the auxiliary electrode to the workpiece to produce a low current between the primary electrode and said workpiece;

detecting the presence of said low current at said workpiece; and automatically arresting the displacement of the plasma torch toward the workpiece in response to the detected appearance of said low current.

* * * * *